United States Patent
Sahasrabudhe et al.

(10) Patent No.: US 8,225,345 B2
(45) Date of Patent: Jul. 17, 2012

(54) METHOD AND APPARATUS FOR CONTROLLING AN APPARATUS HAVING A PARENTAL CONTROL FUNCTION

(75) Inventors: Rajeev Madhukar Sahasrabudhe, Fishers, IN (US); Graham Malachy Byrne, Corsham (GB)

(73) Assignee: Thomson Licensing, Boulogne-Billacourt (FR)

( * ) Notice: Subject to any disclaimer, the term of this patent is extended or adjusted under 35 U.S.C. 154(b) by 643 days.

(21) Appl. No.: 11/628,280

(22) PCT Filed: Jun. 4, 2004

(86) PCT No.: PCT/US2004/017843
§ 371 (c)(1),
(2), (4) Date: Nov. 30, 2006

(87) PCT Pub. No.: WO2005/122557
PCT Pub. Date: Dec. 22, 2005

(65) Prior Publication Data
US 2007/0234380 A1    Oct. 4, 2007

(51) Int. Cl.
*H04N 7/16* (2006.01)
(52) U.S. Cl. ................. 725/30; 725/28; 725/29
(58) Field of Classification Search ............ 725/29, 725/30, 25, 27, 28
See application file for complete search history.

(56) References Cited

U.S. PATENT DOCUMENTS

| | | | | |
|---|---|---|---|---|
| 5,382,983 A * | 1/1995 | Kwoh et al. | ................. | 348/716 |
| 5,548,345 A * | 8/1996 | Brian et al. | ................. | 725/27 |
| 5,550,575 A * | 8/1996 | West et al. | ................. | 725/28 |
| 5,973,683 A * | 10/1999 | Cragun et al. | ................. | 715/719 |
| 6,144,401 A * | 11/2000 | Casement et al. | ................. | 725/30 |
| 6,230,320 B1 * | 5/2001 | Gakumura | ................. | 725/25 |
| 6,505,348 B1 * | 1/2003 | Knowles et al. | ................. | 725/49 |
| 6,662,365 B1 * | 12/2003 | Sullivan et al. | ................. | 725/25 |
| 6,701,523 B1 * | 3/2004 | Hancock et al. | ................. | 725/25 |
| 6,922,843 B1 * | 7/2005 | Herrington et al. | ................. | 725/30 |
| 2002/0095673 A1 * | 7/2002 | Leung et al. | ................. | 725/25 |
| 2002/0109732 A1 | 8/2002 | Ward, III et al. | | |
| 2002/0181933 A1 * | 12/2002 | Ellis et al. | ................. | 386/46 |
| 2003/0115593 A1 * | 6/2003 | Alten et al. | ................. | 725/28 |

FOREIGN PATENT DOCUMENTS

FR    2828975    2/2003
WO   WO 02/054200    7/2002

OTHER PUBLICATIONS

Search Report Dated Oct. 18, 2004.

* cited by examiner

*Primary Examiner* — Ngoc Vu
(74) *Attorney, Agent, or Firm* — Robert D. Shedd; Joseph J. Opalach; Brian J. Cromarty

(57) ABSTRACT

A method for controlling an apparatus such as a television signal receiver having a parental control function allows users to change a setting associated with the parental control function without first entering a password, while also preventing children from circumventing and defeating the parental control function. The method is also useful for informing parents if a child attempts to change a setting in an effort to circumvent and defeat the parental control function. According to an exemplary embodiment, the method includes steps of enabling a user to change a predetermined setting associated with the parental control function without entering a password, and disabling at least one of an audio output and a video output of the apparatus responsive to the change.

15 Claims, 2 Drawing Sheets

METHOD AND APPARATUS FOR CONTROLLING AN APPARATUS HAVING A PARENTAL CONTROL FUNCTION

This application claims the benefit, under 35 U.S.C. §365 of International Application PCT/US2004/017843, filed Jun. 4, 2004, which was published in accordance with PCT Article 21(2) on Dec. 22, 2005 in English.

The present invention generally relates to parental controls in an apparatus such as a television signal receiver, and more particularly, to a method for controlling an apparatus having a parental control function which, among other things, allows users to change a setting associated with the parental control function without first entering a password, while also preventing children from circumventing and defeating the parental control function.

In today's society, it has become increasingly important for parents to control the television/video viewing and video game playing activities of their children. In particular, parents may be interested in controlling the type of content to which children are exposed, as well as the amount of time in which children engage in such activities. Ideally, parents and children should agree upon certain ground rules regarding these matters. However, even with such an agreement, reality suggests that its enforcement may be difficult, if not impossible. This can be quite troubling for parents, especially busy working parents.

To address this issue, various types of parental control functions are presently available in certain apparatuses such as television signal receivers. Such parental control functions may allow parents to control the content that children are exposed to during their television/video viewing and video game playing activities, as well as the amount of time in which children can engage in such activities. For example, parents can establish certain rating limits that define the type of content children can view, as well as time limit restrictions that define how long children can use the television. Such parental control functions are typically password protected. That is, a user (i.e., parent) must enter a predetermined password before being able to change the settings associated with the parental control function. In this manner, the requirement of a password is intended to prevent children from changing parental control settings, and thereby circumventing and defeating the parental control function.

The requirement of entering a password before changing a setting of an apparatus such as a television signal receiver may not be desirable in all cases. For example, the requirement of password entry before changing certain basic settings of an apparatus such as time-related settings (e.g., time, date, etc.) and/or other settings may be deemed unnecessary and inconvenient by certain users. In fact, the inconvenience and cognitive overhead associated with entering a password may cause some users to avoid using password protected functions altogether. As a result, users may not obtain the benefit of important apparatus functions.

While the requirement of password entry before changing certain basic settings of an apparatus may be undesirable and inconvenient for users, some basic settings, such as time-related settings, are associated with the parental control function and may be changed by children to circumvent and defeat the parental control function. For example, a child may change a time-related setting in order to avoid the time limit restrictions of the parental control function.

Accordingly, there is a need for a method for controlling an apparatus having a parental control function which addresses the foregoing problems, and thereby allows users to change a setting associated with the parental control function without first entering a password, while also preventing children from circumventing and defeating the parental control function. The present invention disclosed herein addresses these and/or other issues.

In accordance with an aspect of the present invention, a method for controlling an apparatus having a parental control function is disclosed. According to an exemplary embodiment, the method comprises steps of enabling a user to change a predetermined setting associated with the parental control function without entering a password, and disabling at least one of an audio output and a video output of the apparatus responsive to the change.

In accordance with another aspect of the present invention, an apparatus having a parental control function is disclosed. According to an exemplary embodiment, the apparatus comprises memory means for storing data representing a predetermined setting associated with the parental control function. Processing means enables a user to change the predetermined setting without entering a password, and disables at least one of an audio output and a video output of the apparatus responsive to the change.

In accordance with still another aspect of the present invention, a television signal receiver having a parental control function is disclosed. According to an exemplary embodiment, the television signal receiver comprises a memory operative to store data representing a predetermined setting associated with the parental control function. A processor is operative to enable a user to change the predetermined setting without entering a password, and to disable at least one of an audio output and a video output of the television signal receiver responsive to the change.

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

Figure 1:
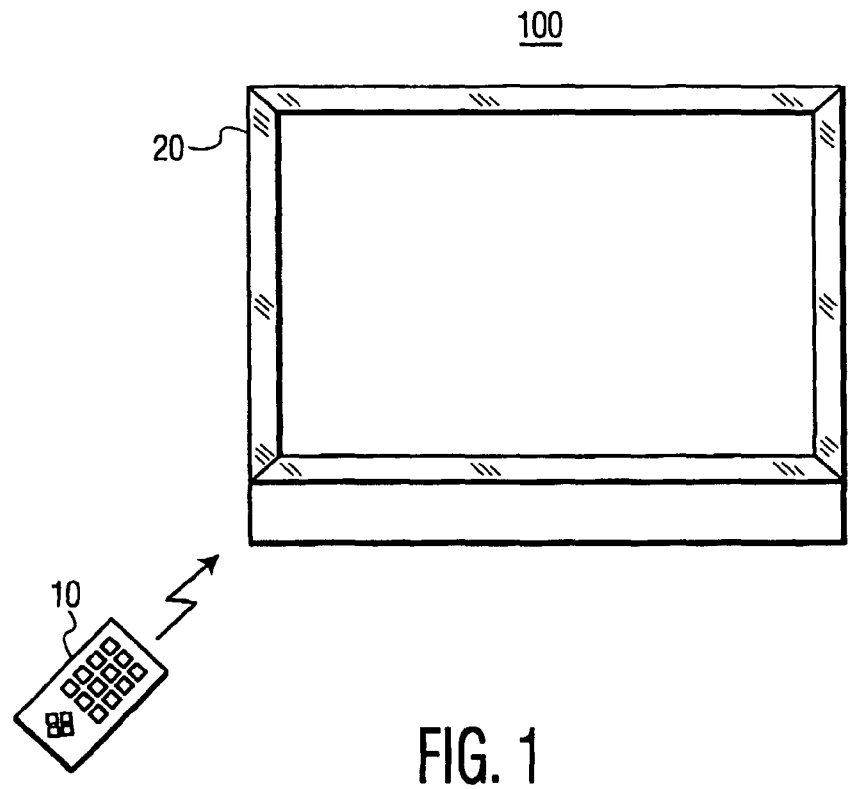
FIG. 1 is an exemplary environment suitable for implementing the present invention.

Referring now to the drawings, and more particularly to FIG. 1, an exemplary environment 100 suitable for implementing the present invention is shown. As indicated in FIG. 1, environment 100 comprises user input means such as user input device 10, and an apparatus 20 having a parental control function. According to an exemplary embodiment, apparatus 20 is embodied as a television signal receiver, but may be embodied as any device or apparatus having a parental control function.

User input device 10 is operative to generate and output control signals that control the operation of apparatus 20 and/or other devices. According to an exemplary embodiment, user input device 10 includes a plurality of input keys and outputs control signals in a wired and/or wireless (e.g., via infrared or radio frequency (RF) link, etc.) manner responsive to user depression of its input keys. User input device 10 may for example be embodied as a hand-held remote control device, wired and/or wireless keyboard, or other user input device.

Apparatus 20 is operative to receive signals including audio, video and/or data signals in analog and/or digital format from one or more signal sources such as terrestrial, cable, satellite, internet and/or other signal sources and to provide aural and/or visual outputs corresponding to these received signals. Apparatus 20 is also operative to process received signals and provide the resulting processed signals to one or more other devices, and to receive signals from such other devices. As previously indicated herein, apparatus 20 includes a parental control function and may be embodied as a television signal receiver. The parental control function of apparatus 20 allows parents to control things such as the content that children are exposed to during their television/video viewing and video game playing activities, and the amount of time in which children can use apparatus 20 for such activities. According to the present invention, users can change a setting associated with the parental control function, such as a time-related setting, without first entering a password. Moreover, the setting can be changed without enabling children to circumvent and defeat the parental control function. Further details regarding these aspects of apparatus 20 will be provided later herein.

Figure 2:
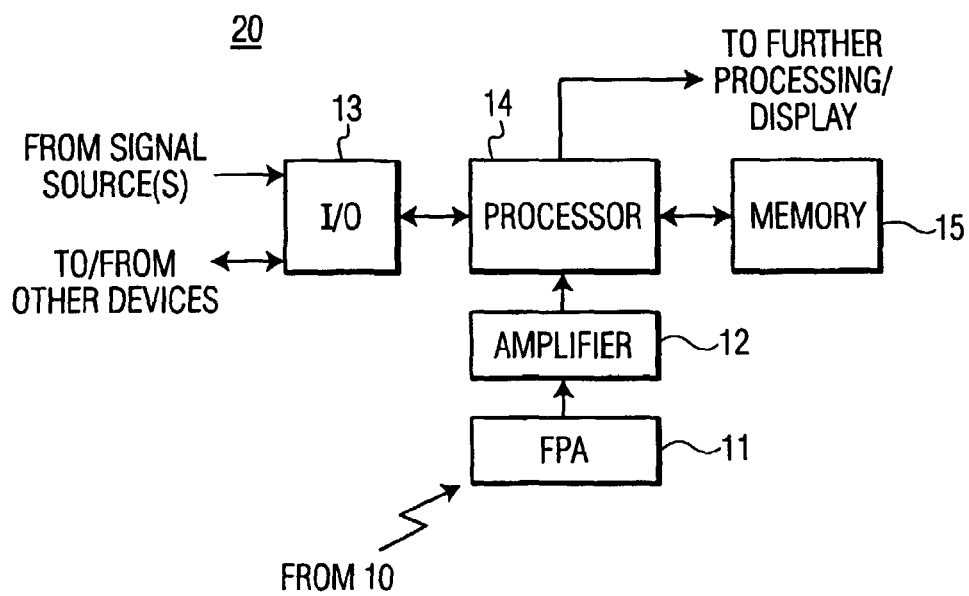
FIG. 2 is a block diagram providing further details of the apparatus of FIG. 1 according to an exemplary embodiment of the present invention.

Referring to FIG. 2, a block diagram providing further details of apparatus 20 of FIG. 1 according to an exemplary embodiment of the present invention is shown. Apparatus 20 of FIG. 2 comprises front panel means such as front panel assembly (FPA) 11, amplifying means such as amplifier 12, and input/output (I/O) means such as I/O block 13, processing means such as processor 14, and memory means such as memory 15. Some of the foregoing elements of FIG. 2 may be embodied using integrated circuits (ICs), and some elements may for example be included on one or more ICs. For clarity of description, certain conventional elements associated with apparatus 20 such as certain control signals, power signals and/or other elements may not be shown in FIG. 2.

FPA 11 is operative to receive user inputs from user input device 10, and to output signals corresponding to the user inputs to amplifier 12. According to an exemplary embodiment, FPA 11 receives signals, such as IR and/or RF signals, from user input device 10 and generates corresponding signals which are output to amplifier 12. Amplifier 12 is operative to amplify the signals provided from FPA 11 for output to processor 14.

I/O block 13 is operative to perform I/O functions of apparatus 20. According to an exemplary embodiment, I/O block 13 is operative to receive signals such as audio, video and/or data signals in analog and/or digital format from one or more signal sources such as terrestrial, cable, satellite, internet and/or other signal sources. I/O block 13 is also operative to output processed signals to one or more other devices, and to receive signals from such devices.

Processor 14 is operative to perform various signal processing and control functions of apparatus 20. According to an exemplary embodiment, processor 14 processes the audio, video and/or data signals provided from I/O block 13 by performing functions including tuning, demodulation, forward error correction, and transport processing functions to thereby generate digital data representing audio, video and/or data content. The digital data produced from such processing functions may be provided for further processing (e.g., MPEG decoding, etc.) and output.

Processor 14 is also operative to execute software code to enable the parental control function of apparatus 20 according to the present invention. According to an exemplary embodiment, processor 14 performs and enables various operations related to the parental control function of apparatus 20 such as, but not limited to, program content detection, selective program blocking by disabling and enabling audio and/or video outputs of apparatus 20, clock and timer functions, on-screen menu displays for user setup and control of the parental control function, password and other input detection, reading and writing data from and to memory 15, and other operations. Further details regarding the parental control function of apparatus 20 will be provided later herein.

Memory 15 is operative to perform data storage functions of apparatus 20. According to an exemplary embodiment, memory 15 stores data including, but not limited to, software code, user setup data, menu data, time-related data, and/or other data.

Figure 3:
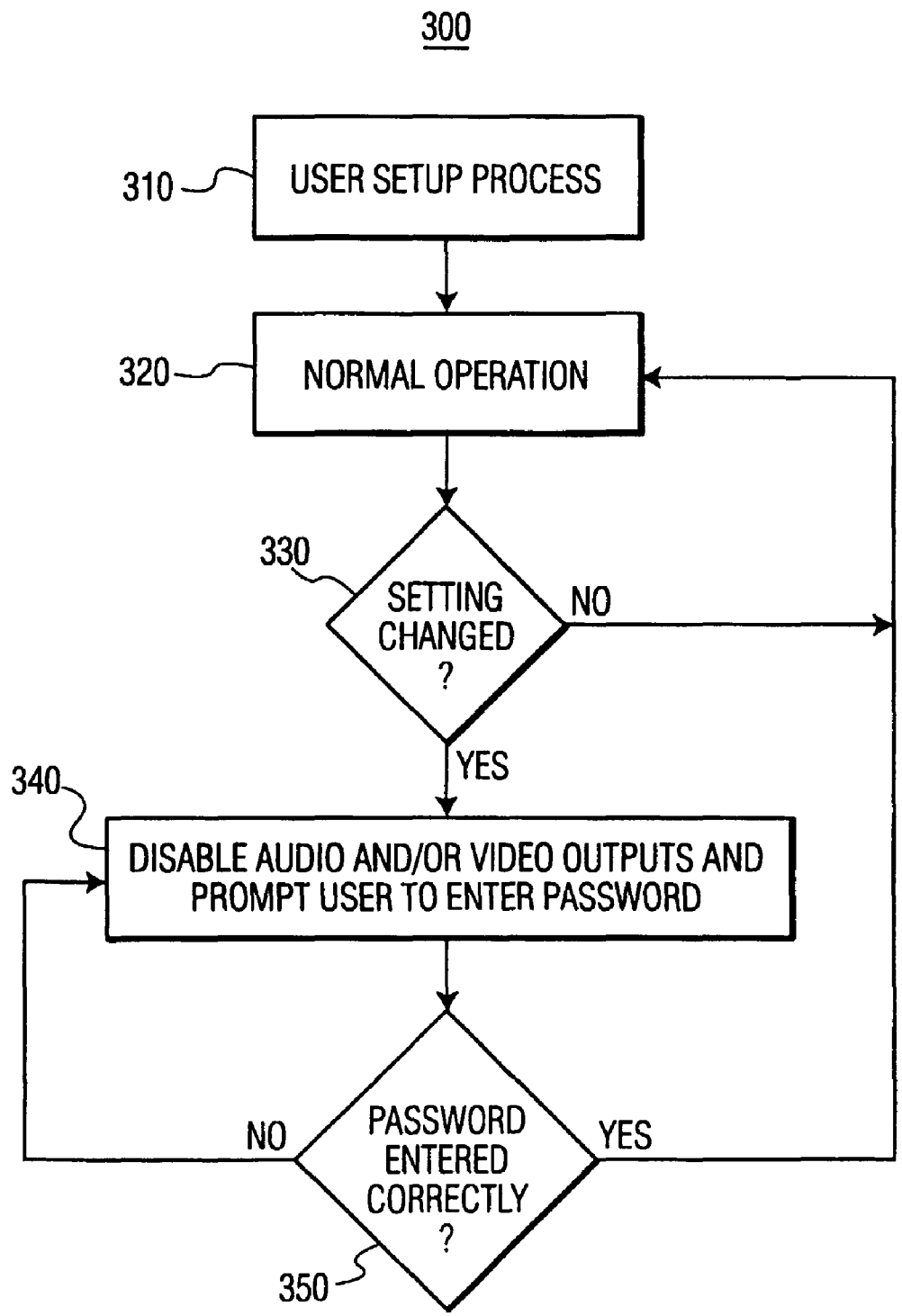
FIG. 3 is a flowchart illustrating steps according to an exemplary embodiment of the present invention.

To facilitate a better understanding of the present invention, an example will now be provided. Referring to FIG. 3, a flowchart 300 illustrating steps according to an exemplary embodiment of the present invention is shown. For purposes of example and explanation, the steps of FIG. 3 will be described with reference to the elements of environment 100 shown in FIGS. 1 and 2. The steps of FIG. 3 are merely exemplary, and are not intended to limit the present invention in any manner.

At step 310, a user setup process for apparatus 20 is performed. According to an exemplary embodiment, a user performs the setup process at step 310 by providing inputs to apparatus 20 via user input device 10 responsive to one or more on-screen menus provided by apparatus 20. The user setup process of step 310 enables users to establish various settings for functions of apparatus 20 including the parental control function. According to an exemplary embodiment, the user setup process for the parental control function enables a user (i.e., parent) to select content rating limits for program blocking so that programs/videos having rating levels above the selected rating limits may be blocked from output. The rating limits/levels may for example be based on the well-known MPAA rating system (e.g., G, PG-13, R, etc.) and/or another rating system (e.g., EIA-766, etc.). The rating limits may be established on a child-by-child basis. That is, the parent may establish different rating limits for each child in a given household.

According to an exemplary embodiment, the user setup process for the parental control function of step 310 also enables a user (i.e., parent) to establish time limit restrictions for the use of apparatus 20. The time limit restrictions limit the amount of time a child may use apparatus 20 for things such as viewing programs/videos and playing video games. The time limit restrictions may also be established on a child-by-child basis, such that different time limit restrictions apply to each child in a given household. The manner in which the time limit restrictions are established and applied is a matter of design choice. For example, the time limit restrictions may be established such that a child has a maximum amount of time to use apparatus 20 every given period (e.g., daily, weekly, monthly, etc.). A more elaborate approach may for example allow a parent to establish time limit restrictions on a more specific basis (e.g., no use before 5 pm on weekdays, 3 hours maximum use on weekends, etc.). All types of time limit restrictions are within the scope of the present invention.

According to an exemplary embodiment, the user setup process of step 310 also enables users to enter time-related settings (e.g., time of day, day of the week, month and date, etc.), and to select a password for the parental control function. Other settings for apparatus 20 may also be established at step 310. Data corresponding to the settings established during the user setup process of step 310 is stored in memory 15 under the control of processor 14.

At step 320, apparatus 20 operates in a normal manner. During normal operation, apparatus 20 may provide audio and/or video outputs based on user program selection via user input device 10, and the parental control function operates in accordance with the settings established during the user setup process of step 310. Accordingly, during normal operation, processor 14 may selectively enable and disable audio and/or video outputs of apparatus 20 based on a comparison between the established parental control settings and detected content of received audio, video and/or data signals. Processor 14 may for example detect the content of such signals by extracting and processing data included in the vertical blanking interval (VBI) of received analog television signals, or data included in predetermined data packets of received digital television signals.

According to an exemplary embodiment, processor 14 also enforces the time limit restrictions of the parental control function during normal operation at step 320 by controlling a timer function to keep track of the amount of time each household child uses apparatus 20 (e.g., to watch programs and play video games). Accordingly, processor 14 updates certain time-related data stored in memory 15 in accordance with each child's use of apparatus 20. Also according to an exemplary embodiment, processor 14 disables the audio and video outputs of apparatus 20 if a given child's allotted use time for apparatus 20 has expired. Once a child's allotted use time expires, the password established at step 310 may need to be entered to restore the audio and video outputs of apparatus 20. Also during normal operation at step 320, apparatus 20 may receive user inputs via user input device 10, such as user inputs to change certain settings including the settings established at step 310.

At step 330, apparatus 20 determines whether a predetermined setting associated with the parental control function has been changed by a user. According to an exemplary embodiment, processor 14 enables users to change certain settings associated with the parental control function of apparatus 20 without first entering the password for the parental control function. For example, a time-related setting such as a time of day setting, a day of the week setting, and/or a month and date setting may be changed by a user without entering a password beforehand. As previously indicated herein, time-related settings affect the parental control function of apparatus 20 in that time information is used to control the time limit restrictions established during the user setup process of step 310. According to the present invention, settings other than time-related settings may also be changed by a user without first entering a password. By enabling users to change certain settings without first entering a password, the present invention may advantageously prevent users who normally avoid functions/settings that require a password from essentially abandoning certain functions of apparatus 20.

If the determination at step 330 is negative, process flow loops back to step 320 where apparatus 20 continues to operate in a normal manner. Alternatively, if the determination at step 330 is positive, process flow advances to step 340 where processor 14 disables the audio and/or video outputs of apparatus 20 and enables an output prompting the user to enter the password for the parental control function. According to an exemplary embodiment, processor 14 may disable the audio output only, the video output only, or both at step 340. This is a matter of design choice.

At step 350, processor 14 determines whether the password for the parental control function is correctly entered by a user. If the determination at step 350 is positive, process flow loops back to step 320 where apparatus 20 resumes normal operation. Alternatively, if the determination at step 350 is negative, process flow loops back to step 340 where the audio and/or video outputs of apparatus 20 remain disabled and the user continues to be prompted for the predetermined password. In this manner, the audio and/or video outputs of apparatus 20 remain disabled until the password is correctly entered at step 350, presumably by a parent. This aspect of the exemplary embodiment of FIG. 3 may be particularly useful for informing parents if a child attempts to change a setting in an effort to circumvent and defeat the parental control function of apparatus 20. According to a variation of the exemplary embodiment of FIG. 3, the audio and/or video outputs of apparatus 20 may be disabled for only a predetermined time period. According to this variation, apparatus 20 would automatically return to normal operation (i.e., step 320) after the predetermined time period expires, even though the password was not correctly entered by a user. This approach, however, may be less effective for informing parents if a child attempts to circumvent and defeat the parental control function.

As described herein, the present invention provides a method for controlling an apparatus such as a television signal receiver having a parental control function which, among other things, allows users to change a setting associated with the parental control function without first entering a password, while also preventing children from circumventing and defeating the parental control function. The present invention is also useful for informing parents if a child attempts to change a setting in an effort to circumvent and defeat the parental control function.

The present invention may be applicable to various systems, devices and/or apparatuses, either with or without a display device. Accordingly, the phrase "television signal receiver" as used herein may refer to systems or apparatuses including, but not limited to, television sets, computers or monitors that include a display device, and systems or apparatuses such as set-top boxes, video cassette recorders (VCRs), digital versatile disk (DVD) players, video game boxes, personal video recorders (PVRs), computers or other apparatuses that may not include a display device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method for controlling an apparatus having a parental control function, comprising:
    enabling a user to change a predetermined setting associated with said parental control function without entering a password; and
    responsive to said change of a predetermined setting associated with said parental control function without entering a password: disabling at least one of an audio output and a video output of said apparatus and prompting a user for entry of a password.

2. The method of claim 1, wherein said predetermined setting includes a time-related setting.

3. The method of claim 2, wherein said parental control function enables a first user to limit an amount of time a second user can use said apparatus.

4. The method of claim 2, wherein said time-related setting includes at least one of:
    a time of day setting;
    a day of the week setting; and
    a month and date setting.

5. The method of claim 1, further comprised of enabling said audio and video outputs of said apparatus if said password is correctly entered.

6. An apparatus having a parental control function, comprising:
   memory means for storing data representing a predetermined setting associated with said parental control function; and
   processing means for enabling a user to change said predetermined setting without entering a password, and for, responsive to said change of a predetermined setting associated with said parental control function without entering a password: disabling at least one of an audio output and a video output of said apparatus and prompting a user for entry of a password.

7. The apparatus of claim 6, wherein said predetermined setting includes a time-related setting.

8. The apparatus of claim 7, wherein said parental control function enables a first user to limit an amount of time a second user can use said apparatus.

9. The apparatus of claim 7, wherein said time-related setting includes at least one of:
   a time of day setting;
   a day of the week setting; and
   a month and date setting.

10. The apparatus of claim 6, wherein said processing means further enables said audio and video outputs of said apparatus if said password is correctly entered.

11. A television signal receiver having a parental control function, comprising:
   a memory operative to store data representing a predetermined setting associated with said parental control function; and
   a processor operative to enable a user to change said predetermined setting without entering a password, and, responsive to said change of a predetermined setting associated with said parental control function without entering a password: to disable at least one of an audio output and a video output of said apparatus and prompt a user for entry of a password.

12. The television signal receiver of claim 11, wherein said predetermined setting includes a time-related setting.

13. The television signal receiver of claim 12, wherein said parental control function enables a first user to limit an amount of time a second user can use said television signal receiver.

14. The television signal receiver of claim 12, wherein said time-related setting includes at least one of:
   a time of day setting;
   a day of the week setting; and
   a month and date setting.

15. The television signal receiver of claim 11, wherein said processor is further operative to enable said audio and video outputs of said television signal receiver if said password is correctly entered.

* * * * *